United States Patent [19]
Coates

[11] Patent Number: 5,620,504
[45] Date of Patent: Apr. 15, 1997

[54] PRESSURE SWING ADSORPTION APPARATUS VALVE ACTIVATION

[75] Inventor: John R. Coates, Farnham, England

[73] Assignee: The BOC Group plc, Windlesham, England

[21] Appl. No.: 598,415

[22] Filed: Feb. 8, 1996

Related U.S. Application Data

[63] Continuation of Ser. No. 373,154, Jan. 17, 1995, abandoned.

[30] Foreign Application Priority Data

Jan. 25, 1994 [GB] United Kingdom .................. 9401422

[51] Int. Cl.$^6$ ................................................. B01D 53/053
[52] U.S. Cl. ................................ 96/114; 96/116; 96/130; 96/132; 96/133; 96/144
[58] Field of Search .................. 96/108, 109, 113–116, 96/121, 130–134, 142, 144

[56] References Cited

U.S. PATENT DOCUMENTS

| | | | |
|---|---|---|---|
| 3,080,693 | 3/1963 | Glass et al. | 96/113 |
| 3,160,486 | 12/1964 | Busch, Jr. | 96/116 X |
| 3,472,000 | 10/1969 | Glass et al. | 96/113 |
| 3,486,303 | 12/1969 | Glass et al. | 96/114 |
| 3,659,399 | 5/1972 | Kauer, Jr. et al. | 96/113 X |
| 3,923,477 | 12/1975 | Armond et al. | 96/130 X |
| 3,923,479 | 12/1975 | Glass et al. | 96/114 |
| 3,937,622 | 2/1976 | Hewitt et al. | 96/113 |
| 4,168,149 | 9/1979 | Armond et al. | 96/130 X |
| 4,247,311 | 1/1981 | Seibert et al. | 96/116 X |
| 4,640,694 | 2/1987 | Leitgeb et al. | 96/130 X |
| 4,983,190 | 1/1991 | Verrando et al. | 96/130 X |
| 5,145,495 | 9/1992 | Elamin | 96/115 X |
| 5,169,419 | 12/1992 | Mori et al. | 96/131 |
| 5,344,474 | 9/1994 | Null | 55/344 |

*Primary Examiner*—Robert Spitzer
*Attorney, Agent, or Firm*—Coleman R. Reap; Larry R. Cassett

[57] ABSTRACT

A pressure swing adsorption apparatus (10) is provided with actuator air via a reservoir (40) which draws its supply either from one or more of the process vessels (12) after it has been dried thereby or directly from the system compressor (32). Controls are provided to ensure actuator air is preferentially drawn from the dried source and for ensuring instrument air is available even on start up of the apparatus.

9 Claims, 1 Drawing Sheet

PRESSURE SWING ADSORPTION APPARATUS VALVE ACTIVATION

This is a continuation of application Ser. No. 08/373,154 filed Jan. 17, 1995, now abandoned.

FIELD OF INVENTION

The present invention relates to an apparatus for the separation of air by the Pressure Swing Adsorption (PSA) process and relates particularly, but not exclusively, to the actuation of valves associated with such an apparatus.

BACKGROUND OF INVENTION

It is known to use Nitrogen PSA product gas or feed air when pressurised, to actuate the process valves of a PSA apparatus. The feed air supplied to a PSA plant from its normal dedicated compressor is typically saturated in both oil and water, or at least water if an oil free compressor is used. Product Nitrogen is often used as the actuator gas after the initial start up so as to avoid the problems associated with a saturated supply.

The above arrangement saves the cost of providing a separate supply of instrument air or the necessity to draw air from a separate factory supply. Both these alternatives would introduce extra cost and increase the likelihood of plant failures occurring.

With oxygen PSA systems, it is still possible to use the feed air supply with its inherent problems of saturated gas, however, for safety reasons the dry product gas cannot be used.

It is an object of the present invention to provide a means of providing a source of actuator gas to the process valves and instrumentation of a PSA apparatus which reduces and possibly eliminates the problems associated with the above mentioned arrangements. It can also be used with Nitrogen PSA system, saving the product gas. Fairly insignificant on large plants but a far greater percentage on small plants.

SUMMARY OF THE INVENTION

Accordingly, the present invention provides an apparatus for the separation of air by the Pressure Swing Adsorption process which comprises one or more pressure vessels having an inlet and an outlet and at least one gas actuated actuator for controlling the flow of gas through said vessel or vessels, said one or more pressure vessels having in flow series a first moisture adsorbing material and a second gas adsorbing material, in which there is further provided a reservoir for receiving a portion of said air passing through said pressure vessel after it has passed through at least a portion of said moisture adsorbing material but before it passes through the main body of said second gas adsorbing material and directing means for directing said dried air to said reservoir and from said reservoir to said at least one gas actuated actuator for the actuation thereof.

Preferably the directing means comprises a pipe and non return valve for preventing dried air leaking back into the pressure vessel.

Conveniently, the directing means further includes an actuated valve.

Advantageously, the apparatus comprises two or more pressure vessels and means for drawing dried air from each vessel thereby to prevent a pressure imbalance therebetween.

The apparatus may additionally comprise a wet air supply means for supplying ambient air directly to the reservoir.

Advantageously the apparatus further includes first control means for directing compressed undried ambient air to said reservoir whenever the supply available from said one or more vessels is below a predetermined pressure.

Conveniently, the first control means comprises a pressure switch.

In a particularly advantageous arrangement the apparatus further includes second control means for initiating withdrawal of dried air from said one or more pressure vessels at or near the end of an adsorption cycle.

The first moisture adsorbing material may comprise alumina or zeolite or a silica gel or similar drying material or a combination thereof.

BRIEF DESCRIPTION OF THE DRAWINGS

The present invention will now be more particularly described by way of example only with reference to the drawing attached hereto which illustrates a PSA apparatus incorporating features of the present invention.

DETAILED DESCRIPTION OF THE INVENTION

Figure 1:
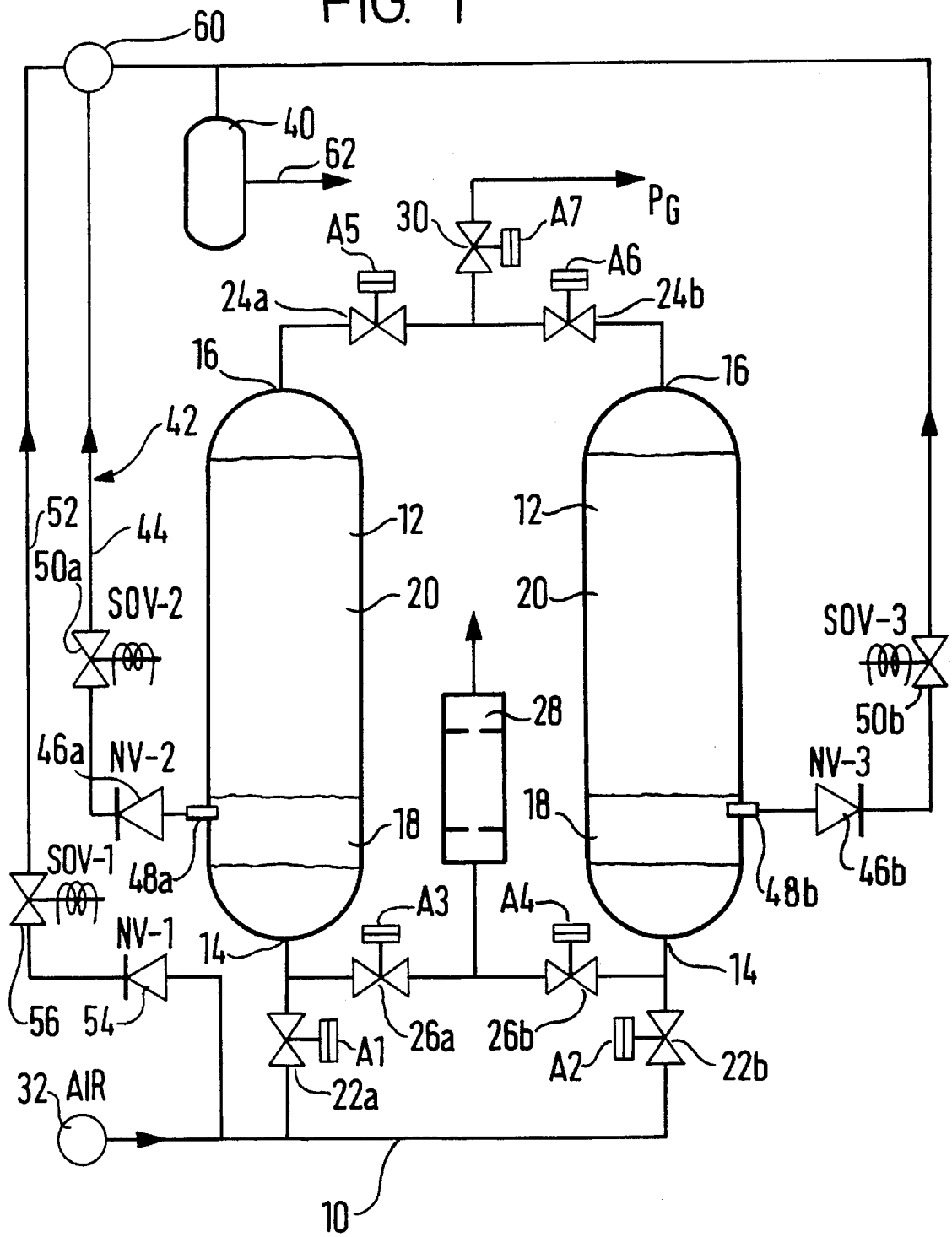

Referring to the drawing, a PSA apparatus 10 comprises one or more pressure vessels 12 each of which is provided with an inlet 14 for receiving wet ambient air and an outlet 16 through which product gas is passed. Each vessel 12 includes, in flow series, a moisture adsorbing material 18 of, for example, alumina, zeolite or a combination thereof and a gas adsorbing material 20 for adsorbing one or more undesirable elements of the incoming air. The gas adsorbing material may comprise zeolite or any one of a number of suitable materials. Each vessel 12 is provided with an inlet valve 22a, 22b and an outlet valve 24a, 24b for controlling the flow of air into the vessel and product gas $P_G$ out thereof. Additional valves 26a, 26b allow the inlet end of each vessel 12 to be connected to vent 28 to vent the contents of the vessels during desorption. Supplementary outlet valve 30 acts to prevent product gas being drawn from the apparatus and acts in conjunction with valves 24a, 24b to allow a portion of the product gas to pass from one vessel to the other during desorption. Thusfar, the apparatus 10 is fairly conventional in form. Whilst the operation of a two bed PSA apparatus is well known in the art and therefore needs no detailed explanation herein we offer the following brief guide to the operation thereof so as to enable the merits of the present invention to be fully appreciated.

In operation, air is compressed by compressor 32 and directed to one or other of the vessels 12 in which water vapour and any undesired elements of the air are removed by the adsorptive properties of adsorbent 18 and 20 respectively. Product gas $P_G$ is allowed to pass from the vessel 12 and through valve 30 at the end of an adsorption cycle. Saturated adsorbent is re-generated during a desorption step in which a small portion of the product gas from the second vessel is used to purge the first vessel and facilitate the desorption and expelation to atmosphere via vent 28 of the adsorbed elements. Valves 22, 24, 26 and 30 are operated as and when required in order to facilitate the adsorption/desorption process.

Under normal circumstances, the various valves mentioned thusfar would be actuated by associated actuators A1–A7 each of which makes use of wet compressed air or pressurised product gas to move the actuators. The disadvantages of using either of these sources of pressurised gas are clear, wet air will cause corrosion to occur thus damaging the actuators, whilst the use of product gas can, in certain circumstances, be unsafe.

The present invention reduces and possibly eliminates the problems associated with the above mentioned arrangements by providing a source of non volatile and comparatively low water content pressurised actuator gas.

Features of the present invention include a reservoir 40 for receiving a portion of any air passing through one or other or both pressure vessels 12 after it has passed through at least a portion of said moisture adsorbing adsorbent 18 but before it passes through the main body of the second gas adsorbing, adsorbent 20. A directing means 42 in the form of pipe 44 and non-return valve 46 is provided for directing the dried air to the reservoir 40 as and when required. A tapping point 48 provided on the side of one or other or both vessels 12 at a position corresponding to a point within the first moisture adsorbing adsorbent 18 or between this position and just within the body of the second gas adsorbing adsorbent 20 is provided for the purpose of withdrawing air from the vessel(s) 12 after it has been dried. For safety purposes and to ensure that dried air can not leak back into the process vessel 12 during the desorption step, an actuator valve 50a or 50b of the solenoid type may be provided downstream of non-return valve 46a or 46b, respectively.

An additional source of compressed air may be provided directly from compressor 32. The means for delivering this undried air comprises pipe 52, non return valve 54 and optional actuator valve 56 typically of the solenoid type. A first control means in the form of a pressure switch (not shown) may be provided for ensuring that compressed but undried air is provided to the reservoir 40 whenever a supply of dried air is not available.

Also shown in FIG. 1 is a second control means 60 connected for operating actuators A1–A7 and valves SOV-1 to SOV-3 as and when desired.

The operation of the present invention is comparatively simple and involves the timed operating of valves 50a, 50b and 56. Whenever one or other of the vessels 12 is being operated on adsorbing portion of its cycle, pressurised and dried air is drawn from tapping 48 (*a* or *b*) and directed to the reservoir 40 via non-return valve 46 (*a* or *b*) and opened valve 50 (*a or b*). Preferably, valves 50 are operated so as to open only during the last part of the desorption cycle, when the pressure in the vessel on production and the reservoir air are approximately equal. This ensures that if the non-return valves 46 (*a* or *b*) leak no gas flow leaves the buffer returning to the vessels. The use of this point in the cycle also ensures that the gas used is as near air as possible, but dry. Typically –5° to –40° dew point depending upon the position and timing of the tapping.

During start up, when there is little or no pressurised gas in the reservoir, wet air is provided directly from compressor 32 via solenoid actuated valve 56. This wet air is used to initiate plant start up but is soon replaced by dry air from one or other of the vessels 12. Conveniently, a pressure switch 60 acts as a first control means to ensure air is drawn directly from compressor 32 only when there is insufficient pressure of supply available from the vessels 12. Alternatively, valve 56 may be controlled to operate only at start up.

It should be noted that any moisture transferred to the reservoir 40 during start up is quickly removed by the dry process supply. The process supply is typically air ±0.5% $O_2$ variations. Such variations would require more than two failures in equipment to increase the oxygen content above acceptable safety limits and then only for a very short time. The system is, therefore, inherently safe.

Air from reservoir 40 is supplied to actuators A1–A7 and any other system actuators via line 62. A second control system (now shown), connected to all actuators and valves, provides for initiating control over the flow of air to the reservoir. Such control may be provided on a timed basis with each valve being actuated at a particular point in the operating cycle or may be provided at least in part on a pressure detection basis in which case the various valves are actuated depending upon the pressures generated in various parts of the apparatus.

It will be appreciated that whilst the above mentioned system removes process gas from around the alumina/zeolite interface, it will work equally well on systems which incorporate only zeolite or a similar gas separation medium. The first portion of the bed acting as a gas drying layer.

I claim:

1. An apparatus for the separation of air by the Pressure Swing Adsorption process comprises one or more pressure vessels having an inlet and an outlet and at least one gas actuated actuator for controlling the flow of gas through said vessel or vessels, said one or more pressure vessels having in flow series a first moisture adsorbing material and a second gas adsorbing material, in which there is further provided a reservoir for receiving a portion of said air passing through said pressure vessel after it has been dried by being passed through at least a portion of said moisture adsorbing material but before it passes said second gas adsorbing material, and directing means for directing the dried air to said reservoir and from said reservoir to said at least one gas actuated actuator for the actuation thereof.

2. An apparatus as claimed in claim 1 in which the directing means comprises a pipe and non return valve for preventing dried air leaking back into the pressure vessel.

3. An apparatus as claimed in claim 2 in which the directing means further includes an actuated valve.

4. An apparatus as claimed in any one of claims 1 to 3 including two or more of said pressure vessels and means including valves and valves actuators for controlling the flow of dried air from each vessel thereby to prevent a pressure imbalance therebetween.

5. An apparatus as claimed in any one of claims 1 to 3 further including wet air supply means for supplying ambient air directly to said reservoir.

6. An apparatus as claimed in claim 5 further including first control means for directing compressed undried ambient air to said reservoir whenever the supply available from said one or more vessels is below a predetermined pressure.

7. An apparatus as claimed in claim 6 in which said first control means comprises a pressure switch.

8. An apparatus as claimed in any one of claims 1 to 3 including second control means for initiating withdrawal of dried air from said one or more pressure vessels at or near the end of an adsorption cycle.

9. An apparatus as claimed in any one of claims 1 to 3 in which said first moisture adsorbing material comprises alumina or zeolite or other moisture removing material or a combination thereof.

\* \* \* \* \*